(12) United States Patent
Borrelli et al.

(10) Patent No.: US 6,813,077 B2
(45) Date of Patent: Nov. 2, 2004

(54) METHOD FOR FABRICATING AN INTEGRATED OPTICAL ISOLATOR AND A NOVEL WIRE GRID STRUCTURE

(75) Inventors: Nicholas F. Borrelli, Elmira, NY (US); David G. Grossman, Corning, NY (US); Kenjro Hasui, Osaka (JP); Tamio Kosaka, Fukuroi (JP); Nick J. Visovsky, Corning, NY (US)

(73) Assignee: Corning Incorporated, Corning, NY (US)

( * ) Notice: Subject to any disclaimer, the term of this patent is extended or adjusted under 35 U.S.C. 154(b) by 235 days.

(21) Appl. No.: 09/884,640

(22) Filed: Jun. 19, 2001

(65) Prior Publication Data

US 2002/0191880 A1 Dec. 19, 2002

(51) Int. Cl.[7] .................................................. G02B 5/30
(52) U.S. Cl. ...................... 359/486; 359/484; 359/485; 359/488; 359/282; 216/24; 216/44; 216/52; 264/1.31; 264/1.36; 264/1.6; 438/691; 438/700; 438/735
(58) Field of Search ................................ 359/484–486, 359/488, 282, 281; 216/24, 44, 52; 264/1.31, 1.36, 1.6; 438/691, 700, 735

(56) References Cited

U.S. PATENT DOCUMENTS

| 5,603,871 | A | * | 2/1997 | Koseko et al. ............... 264/1.9 |
| 5,757,538 | A | | 5/1998 | Siroki ......................... 359/282 |
| 5,772,905 | A | | 6/1998 | Chou ........................... 216/44 |
| 6,375,870 | B1 | * | 4/2002 | Visovsky et al. ........... 264/1.31 |
| 6,384,971 | B1 | * | 5/2002 | Faris ........................... 359/483 |
| 6,391,528 | B1 | * | 5/2002 | Moshrefzadeh et al. ..... 430/321 |
| 6,532,111 | B2 | * | 3/2003 | Kurtz et al. ................. 359/486 |

OTHER PUBLICATIONS

M. Koeda et al., Production of Metallic Grating, Abstract: PAJ–06–174907, Jun. 24, 1994.
T. Katsuragawa et al., Polarizer, Its Production and Display or Display Device Provided with Polarizer, Abstract: PAJ–10–213785, Aug. 11, 1998.
Y. Sato, Production of Grid Type Polarizer, Abstract: PAJ 09–090122, Apr. 4, 1997.
S. Kawakami, Polarizing Element, Abstract: PAJ 04–256904, Nov. 9, 1992.

* cited by examiner

Primary Examiner—Audrey Chang
Assistant Examiner—Craig Curtis
(74) Attorney, Agent, or Firm—Timothy M. Schaeberle

(57) ABSTRACT

A method for fabricating an integrated optical isolator includes depositing a wire grid material on a magneto-optical substrate and depositing a resist film on the wire grid material. The method further includes bringing a mold with a wire grid pattern on contact with the resist film and compressing the mold and resist film together so as to emboss the wire grid pattern in the resist film. The method further includes transferring the wire grid pattern in the resist film to the wire grid material on the magneto-optical substrate by etching.

13 Claims, 5 Drawing Sheets

METHOD FOR FABRICATING AN INTEGRATED OPTICAL ISOLATOR AND A NOVEL WIRE GRID STRUCTURE

BACKGROUND OF INVENTION

1. Field of the Invention

The invention relates to methods for fabricating integrated optical isolators. More specifically, the invention relates to a method for forming a wire grid polarizer on a Faraday rotator and a method for suppressing reflection of rejected polarization.

2. Background Art

Fiber-optic communications systems have three major components. These include (1) a transmitter that converts electronic data signals to light signals, (2) an optical fiber that guides the light signals, and (3) a receiver that captures the light signals at the other end of the fiber and converts them to electrical signals. For high-speed data transmission or long-distance applications, the light source in the transmitter is usually a semiconductor laser diode. The transmitter pulses the output of the laser diode in accordance with the data signal to be transmitted and sends the pulsed light into the fiber. In fiber-optic communications systems, some light may be reflected back from the fiber network. This back reflection affects the operation of the laser diode by interfering with and altering the frequency of the laser output oscillations. For this reason, an optical isolator is typically provided between the laser diode and the optical fiber to minimize the back reflection from the fiber network.

FIG. 1 shows a prior art optical isolator 2 which comprises a magneto-optical material 4, called a Faraday rotator, sandwiched between an entrance polarizer 6 and an exit analyzer polarizer 8. The polarizers 6, 8 are typically polarizing glass chips. The exit analyzer polarizer 8 is set at 45° relative to the entrance polarizer 6. The Faraday Rotator 4 and the polarizers 6, 8 are surrounded by a permanent magnet 10, which applies a magnetic field to the Faraday rotator 4. The magnetic field in concert with the Faraday rotator 4 causes the plane of polarization of the incident beam 12 to rotate 45° within the Faraday rotator 4, thus allowing the incident beam 12 to pass through the exit analyzer polarizer 8. The transmitted beam is indicated at 14. Any reflected light that travels in the reverse direction is first polarized at 45° by the exit analyzer polarizer 8. The Faraday effect is non-reciprocal. Thus the light that passes through the Faraday rotator 4 is rotated an additional 45° and is then blocked by the polarizer 6.

To ensure desired characteristics of the optical isolator 2, the polarizers 6, 8 must be precisely aligned with Faraday rotator 4 so that the appropriate angle is formed between the polarizers 6, 8. Because of the alignment requirements, the assembly process of the optical isolator 2 is somewhat labor-intensive. Some manufacturers use manual methods for assembly followed by soldering, gluing, or welding techniques to fix the individual components in place. The materials used to fix the components in place present reliability problems in terms of micro movement of the components in hostile operating conditions. U.S. Pat. No. 5,757,538 issued to Siroki proposes a solution which includes forming polarizing wire grids on both surfaces of a Faraday rotator. The wire grids on the surfaces of the Faraday rotator are used in lieu of the polarizing glass chips 6, 8. The proposal of forming wire grid polarizers on the Faraday rotator suggests that a non-manual/automated process is envisioned. However, the Siroki patent does not indicate how this is done.

Several techniques are available for forming wire grid structures on substrates. One technique known as photolithography involves transferring a wire grid pattern on a photomask to a surface of the substrate. A metal is first deposited on the substrate. Then a photosensitive material, called a photoresist, is applied on the metal layer. The photomask with the wire grid pattern is aligned with the substrate so that the pattern can be transferred to the photoresist. Once the photomask is aligned with the substrate, the photoresist is exposed through the pattern on the photomask with a high intensity ultraviolet light. Mask patterning in the photoresist could be made, for example, by exposing the photoresist to an interference pattern induced by a He-Cd laser. See M. Koeda et al., "Production of Metallic Grating," PAJ-06174907, Jun. 24, 1994. The pattern formed in the photoresist is transferred to the metal layer by etching, e.g., reactive ion etching or ion milling.

Photolithography is widely used in fabricating wire grid polarizers that operate in the mid infrared region (approximately 3 $\mu$m to 25 $\mu$m). However, photolithography has limited application in the near infrared region (approximately 0.75 $\mu$m to 3 $\mu$m) because the grid structure in this region requires submicron features. Currently, the smallest line width that can be made with photolithography is approximately 0.2 $\mu$m. The commercial technology for fabricating submicron patterns is electron beam lithography ("EBL"). EBL involves scanning a beam of electrons across a surface covered with a resist film that is sensitive to those electrons. Other methods for fabricating wire grid polarizers are disclosed in S. Kawakami and H. Tsuchiya, "Polarizing Element," PGJ-61-16991, May 2, 1986, T. Katsuragawa et al, "Polarizer, Its Production and Display or Display Device Provided with Polarizer," PAJ-10213785, Aug. 11, 1998, and Y. Sato, "Production of Grid Type Polarizer," PAJ-09090122, Apr. 4, 1997.

EBL is capable of forming fine patterns but is much slower and generally costlier than photolithography. U.S. Pat. No. 5,772,905 issued to Chou discloses a cost-effective process for forming submicron features on a substrate. The process, called nano-imprint lithography, is essentially an embossing technology. In nano-imprint lithography, a pattern is formed on a mold by such methods as EBL and subsequent etching processes. A mold made in such fashion is used in the embossing process. The mold is brought into contact with a thin film carried on a surface of a substrate, e.g., a silicon wafer, so that the pattern on the mold can be embossed on the thin film. The thin film layer comprises a thermoplastic polymer, e.g., polymethyl methacrylate (PMMA). During the embossing step, the thin film, the substrate, and the mold are heated to allow sufficient softening of the polymer. At this time, pressure is applied to emboss the polymer. After a period of time, the entire assembly is cooled below the glass transition temperature of the polymer and the mold.

Two options are available after embossing the polymer depending on whether the polymer film is carried directly on the surface of the substrate or on a metal layer deposited on the surface of the substrate. If the polymer film is carried directly on the surface of the substrate, the thin sections of the embossed polymer are removed, e.g., by oxygen etching, to expose the underlying substrate. After removing the thin sections, a metallic material is deposited on the exposed substrate. Then, a lift-off process is used to remove the remaining polymer from the substrate. If the polymer film is carried on a metal layer deposited on the surface of the substrate, an etching process such as reactive ion etching or ion milling is used to etch into the metal layer. While etching into the metal layer, the polymer on the metal layer is also removed. If the polymer is not completely removed from the metal layer by the time the pattern is etched into the metal layer, a solvent may be used to remove the remaining polymer.

Before fabricating the mold used in the embossing process, the wire grid pattern on the mold is modeled to ensure that the performance of the resulting wire grid polarizer is acceptable. There are several mathematical models and expressions that can be used to determine the performance of the wire grid polarizer with respect to transmission of parallel and perpendicular electric fields of light. These mathematical models could be based, for example, on Maxwell's theory, transmission line theory, rigorous coupled wave analysis ("RCWA"), etc. Conventional modeling of wire grid polarizers using these methods are generally metallic lines on transparent substrates which would produce useful polarizer. FIG. 2 shows an example of such a wire grid polarizer with parallel metallic lines 16 on a transparent substrate 18. In operation, the polarized light that is not transmitted through the substrate 18 is reflected off the metallic surfaces 16.

SUMMARY OF INVENTION

In one aspect, the invention relates to a method for fabricating an integrated optical isolator which comprises depositing a wire grid material on a magneto-optical substrate and depositing a resist film on the wire grid material. The method further includes bringing a mold with a wire grid pattern in contact with the resist film and compressing the mold and resist film together so as to emboss the wire grid pattern in the resist film. The method further includes transferring the wire grid pattern in the resist film to the wire grid material on the magneto-optical substrate by etching.

In some embodiments, the wire grid material comprises a metallic material. In some embodiments, the wire grid material comprises a dielectric material sandwiched between two metallic materials. In one embodiment, the metallic materials are selected from the group consisting of Al, Au, Cu, Ir, Mo, Ni, Os, Pt, Rh, and W. In one embodiment, the dielectric material is selected from the group consisting of Si, $SiO_2$, and GaAs.

Other aspects and advantages of the invention will be apparent from the following description and the appended claims.

DETAILED DESCRIPTION

Embodiments of the invention provide a process for forming a wire grid polarizer on a Faraday rotator and a novel wire grid structure which suppresses reflection of rejected polarization. The process for forming the wire grid polarizer on a Faraday rotator is based on nano-imprint lithography. In general, the process involves fabricating a mold with a wire grid pattern using EBL. It should be noted that although EBL is slow and relatively expensive, the mold made using this process can be used to replicate many wire grid polarizers. The pattern on the mold is embossed on a polymer resist film that is applied on a wire grid material on a substrate. The pattern in the polymer resist film is transferred to the wire grid material by etching. The disclosed process enables direct fabrication of the wire grid polarizer on a Faraday rotator. In particular, integrated optical isolators wire grid polarizers that are capable of being used at the near infrared region or infrared region can be produced at relatively low cost without sacrificing performance.

Various embodiments of the invention will now be described with reference to the accompanying figures. For convenience, the following description is outlined into three principal sections, including Method for Forming a Wire Grid Polarizer on a Substrate, Integrated Optical Isolator, and Novel Wire Grid Structure.

Method for Forming a Wire Grid Polarizer on a Substrate

Figure 1:
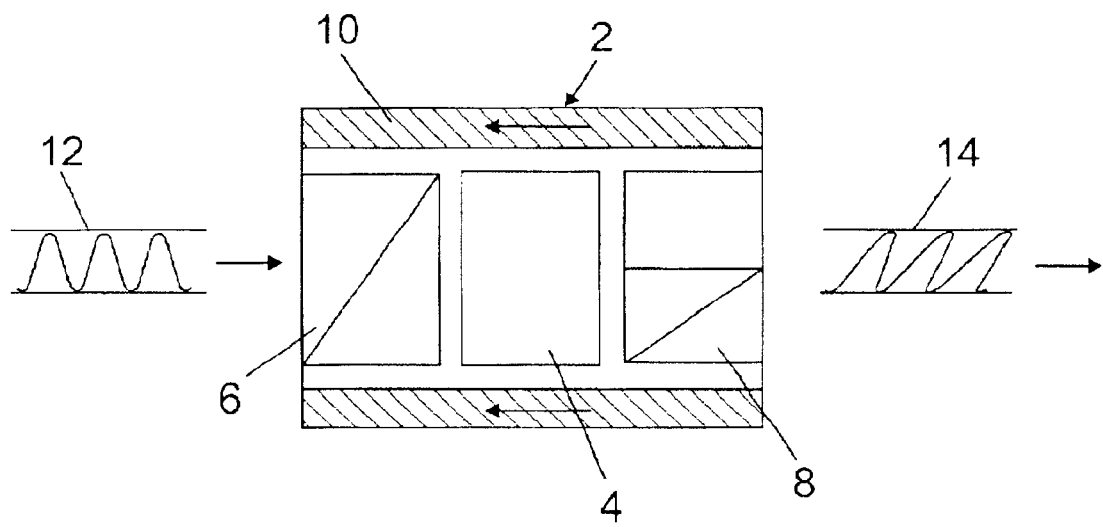
FIG. 1 is a schematic of a prior art optical isolator.
Figure 2:
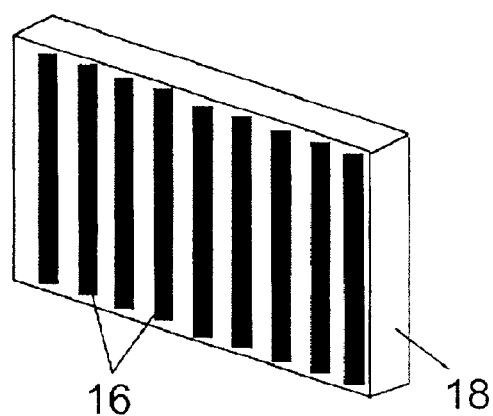
FIG. 2 is a schematic of a wire grid polarizer.
Figure 3A:
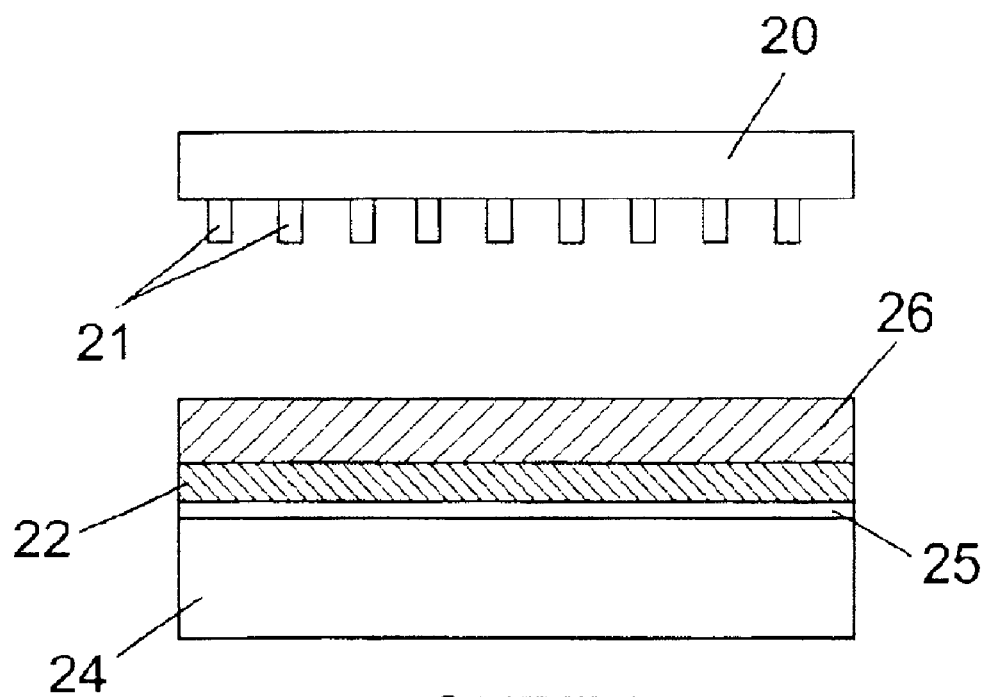
FIG. 3A illustrates the heating step of a process for forming wire grid polarizer on an optical substrate in accordance with one embodiment of the invention.

FIGS. 3A–3D illustrate a process for forming a wire grid polarizer on a substrate. Referring to FIG. 3A, the process starts with fabrication of a mold 20 having a wire grid pattern. In one implementation, the wire grid pattern is an array of parallel grid elements 21 spaced apart a predetermined distance and having a predetermined width and depth. A wire grid material 22 is deposited on a substrate 24. In one embodiment, the wire grid material 22 comprises a metal having a high index of reflection, e.g., aluminum or silver. In the novel wire grid structure of the present invention, which would be further discussed below, the wire grid polarizer material 22 comprises two layers of metal separated by a dielectric material.

Figure 3B:
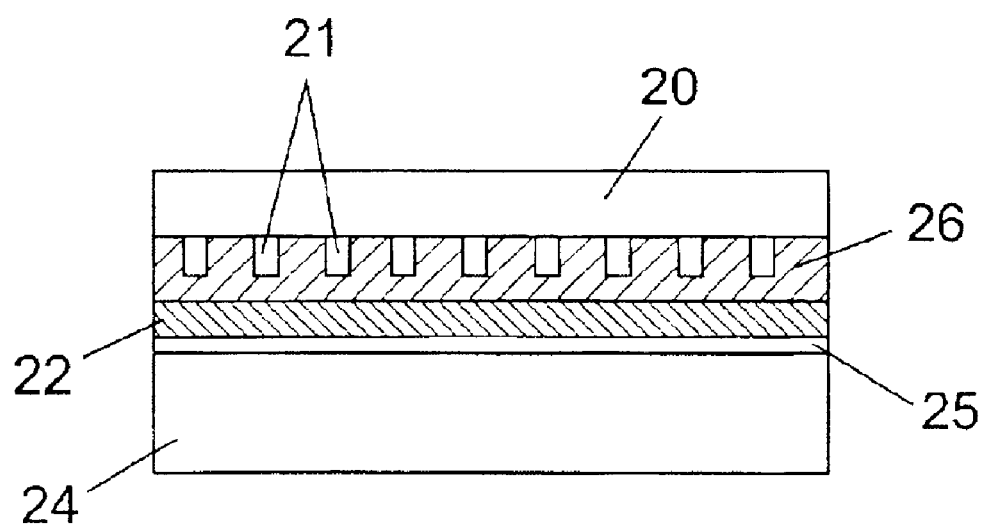
FIG. 3B illustrates the embossing step of the process for forming wire grid polarizer on an optical substrate.

For an optical isolator application, the substrate 24 is a Faraday rotator material, e.g., bismuth-substituted rare-earth iron garnet, and is preferably coated with an anti-reflective material 25 prior to depositing the wire grid material 22. A resist film 26 is applied on the wire grid material 22. The resist film 26 comprises a thermoplastic polymer, e.g., PMMA. To avoid sticking, the thermoplastic polymer is preferably incompatible with the mold 20 and/or the mold 20 is coated with a releasing agent that is incompatible with the thermoplastic polymer. The mold 20 and the resist-coated substrate 24 are brought into contact and heated to a temperature above the glass transition temperature of the thermoplastic polymer. The mold 20 and substrate 24 are compressed together, as shown in FIG. 3B, for a period of time in order to allow the grid elements 21 on the mold 20 to sufficiently penetrate the resist film 26. This process is referred to as embossing.

Figure 3C:
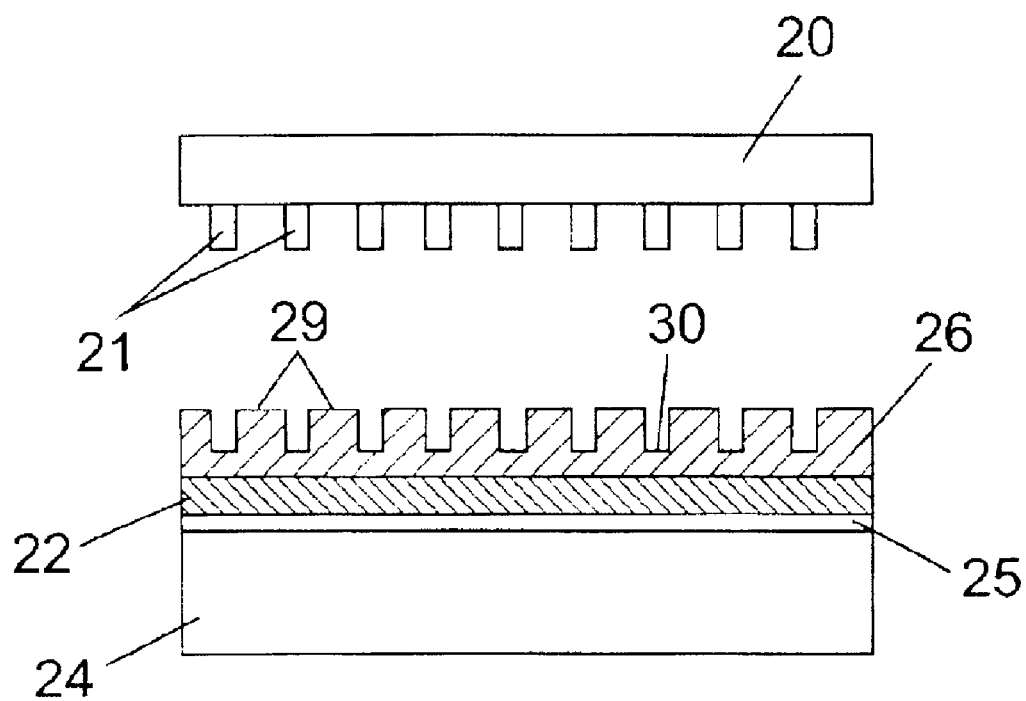
FIG. 3C illustrates the de-embossing step of the process for forming wire grid polarizer on an optical substrate.
Figure 3D:
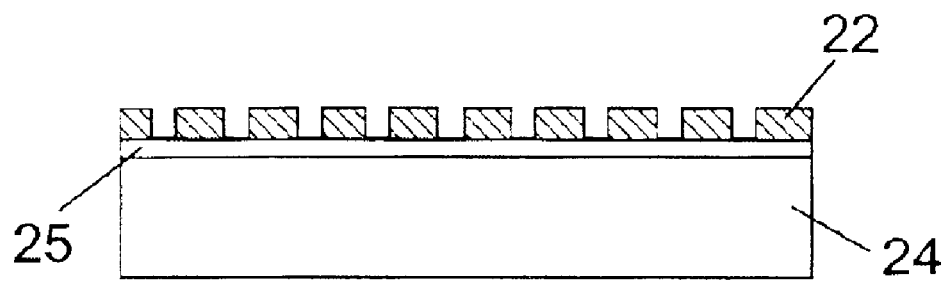
FIG. 3D shows a wire grid polarizer formed on an optical substrate.

Later, the mold 20 and the resist-coated substrate 24 are cooled under constant pressure. After the mold 20 and resist-coated substrate 24 are sufficiently cooled to harden the resist film 26, the mold 20 is separated from the resist-coated substrate 24, as shown in FIG. 3C. This process is referred to as de-embossing. The result of the process is duplication of the wire grid pattern (21 in FIG. 3A) in the resist film 26. The grid pattern in the resist film 26 is then transferred to the wire grid material 22 by anisotropic dry etching, e.g., reactive ion etching or ion milling. The anisotropic etching process etches through the thin sections 30 of the resist film 26 first and then through the wire grid material 22. While etching through the thin sections 30 of the resist film 26 and the wire grid material 22, the thick sections 29 of the resist film 26 are also being etched. The initial thickness of the resist film 26, i.e., the thickness of the resist film 26 before the embossing step, should be selected to allow complete etching through the wire grid material 22 before or by the time the resist film 26 is completely removed. A subsequent solvent rinse or oxygen plasma exposure can be used to remove any resist film 26 that remains after the etching process. FIG. 3D shows the wire grid pattern transferred to the wire grid material 22. This wire grid pattern acts as a wire grid polarizer.

In the examples which follow, a 5 mm square pattern is embossed on PMMA and then transferred to aluminum layer on a glass substrate using the process described above. It should be clear, however, that the examples presented below are intended for illustration purposes only and are not intended to limit the scope of the invention as otherwise described herein.

EXAMPLE 1

In this example, aluminum is evaporated on a glass substrate. The thickness of the aluminum film on the glass substrate is approximately 440 nm. Diluted PMMA is then spin coated on the aluminum layer on the glass substrate. The thickness of the PMMA is approximately 690 nm. A mold with a grid pattern having a grid period of 570 nm and a depth of 690 nm and the PMMA-coated substrate are heated to 110° C. It takes approximately 3 minutes to stabilize the temperature of the mold and the PMMA-coated substrate. The mold and PMMA-coated substrate are compressed together. The contacting pressure between the mold and PMMA-coated substrate is increased up to 67 MPa. The mold and the PMMA-coated substrate are maintained at this contacting pressure for 1 minute and then cooled for 3 minutes. After cooling, the mold is removed from the PMMA. A change in the color of the embossed PMMA with changes in viewing angle indicates that the grid pattern has been made on the PMMA. The embossed PMMA and the underlying aluminum layer are dry-etched by $BCl_3/Cl_2N_2$ gas flow for 90 seconds. The resulting patterned aluminum layer acts as a linear polarizer at the near infrared region. The contrast ratio and insertion loss are determined to be 42 dB and 2.5 dB, respectively, at 1540 nm wavelength. The embossing of the grid pattern on PMMA using the process outlined above takes less than 8 minutes. For comparison purposes, the same grid pattern is made on PMMA using EBL. The patterning process using EBL takes approximately 25 minutes.

EXAMPLE 2

In this example, aluminum is sputtered on a glass substrate. The thickness of the aluminum film is approximately 590 nm. Diluted PMMA is then spin coated on the aluminum layer on the glass substrate. The thickness of the PMMA is approximately 690 nm. A mold with a grid pattern having a grid period of 570 nm and a depth of 690 nm and the PMMA-coated substrate are heated to 110° C. It takes approximately 3 minutes to stabilize the temperature of the mold and substrate. The mold and PMMA-coated substrate are then compressed together with a pressure of 67 MPa. The mold and the PMMA-coated substrate are maintained at this contacting pressure for 1 minute and then cooled for 4 minutes. After cooling, the mold is removed from the PMMA. A change in the color of the embossed PMMA with changes in viewing angle indicates that the grid pattern has been made on the PMMA. The embossed PMMA and the underlying aluminum layer are dry-etched by $BCl_3/Cl_2N_2$ gas flow for 120 seconds. The resulting patterned aluminum layer acts as a linear polarizer at the visible wavelength. The contrast ratio is determined to be in a range from 58 dB to 61 dB and the insertion loss is determined to be in a range from 2.5 dB to 3.1 dB at 1540 nm wavelength.

Integrated Optical Isolator

Figure 4A:
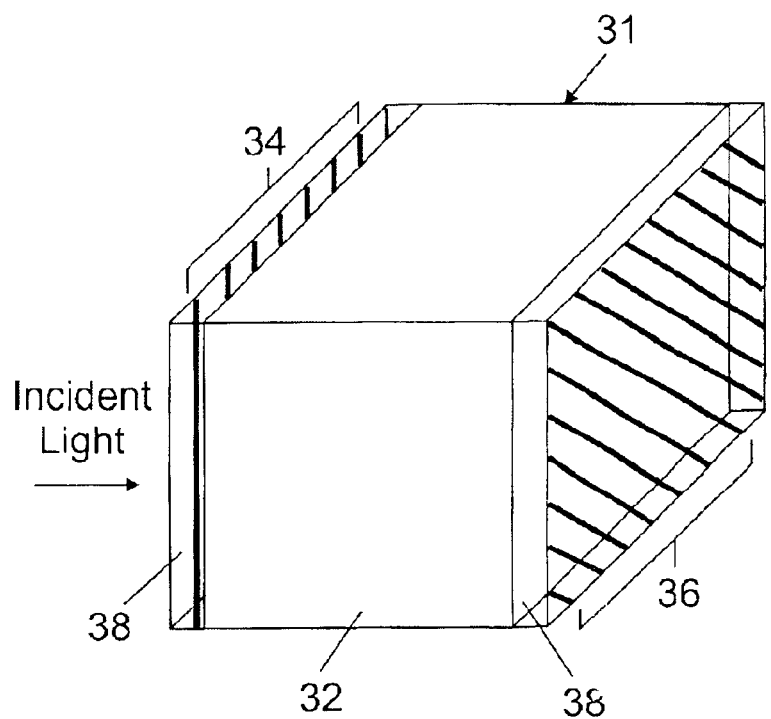
FIG. 4A shows a Faraday rotator with wire grid polarizers formed thereon using the process illustrated in FIGS. 3A–3D.
Figure 4B:
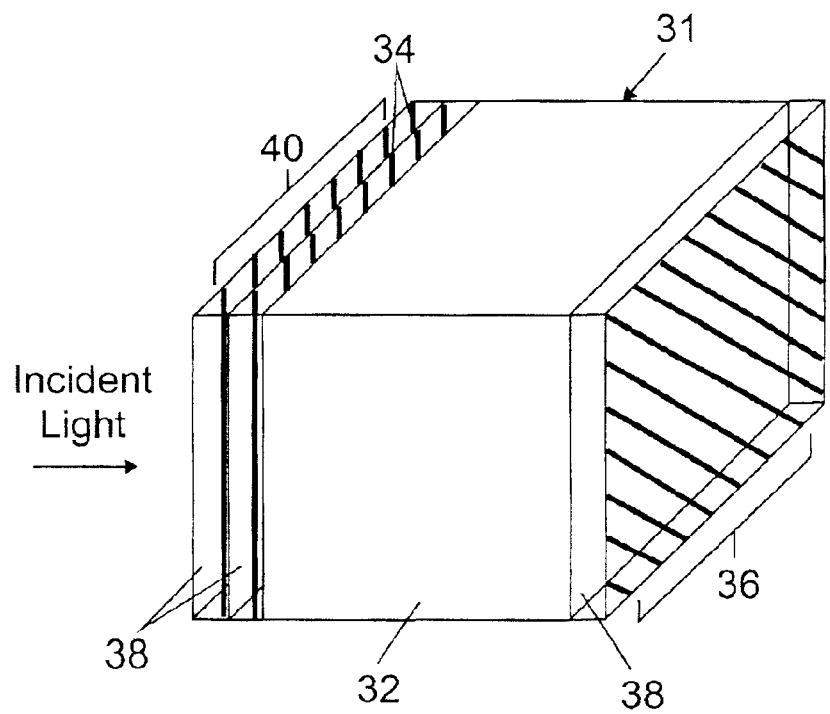
FIG. 4B shows a Faraday rotator with two wire grid polarizers formed on one surface.

FIG. 4A shows an integrated optical isolator 31 which includes a Faraday rotator 32 with wire grid polarizers 34, 36. The Faraday rotator 32 is made of a magneto-optical material. In one embodiment, the Faraday rotator 32 is a bismuth-substituted rare-earth iron garnet substrate such as available under the Latching™ by Lucent Technologies. The Latching™ garnet substrate operates without a bias magnet. In general, any garnet material can be used. In other words, the invention is not limited to latching garnets. The Faraday rotator 32 is coated with an anti-reflective material 38, e.g., silica. The wire grids 34, 36 are formed on the anti-reflection coated Faraday rotator 32 using the process described above. With the anti-reflective coating, the wire grids 34, 36 act as if they were unsupported, causing contrast to increase. Layers of anti-reflective coating and wire grids can be applied to the Faraday rotator 32 to further increase contrast ratio. FIG. 4B shows an example where two layers of wire grids 34, 40 are formed on the incident surface of the Faraday rotator 32.

Returning to FIG. 4A, the wire grids 36 are set at an angle, usually 45°, with respect to the wire grids 34. In operation, the wire grid polarizer 34 polarizes the incident light. The polarized light enters the Faraday rotator 32 and is rotated 45° within the Faraday rotator 32. The rotated polarized light then passes through the wire grid polarizer 36. Any polarization light that does not enter the Faraday rotator 32 gets reflected back to the source (not shown) unless there is a mechanism in place to suppress the reflection. This disclosure presents a novel wire grid structure that suppresses reflection of rejected polarization, as will be subsequently described below. Because the wire grids 34, 36 are directly applied on the anti-reflective coated Faraday rotator 32, a monolithic structure is created where the integrated optical isolator 31 would be more robust and stable in performance when subjected to environmental extremes. By using the process described above, large substrates of garnet can be processed and then diced into individual optical isolator units, thus providing economy of scale.

Novel Wire Grid Structure

Figure 5:
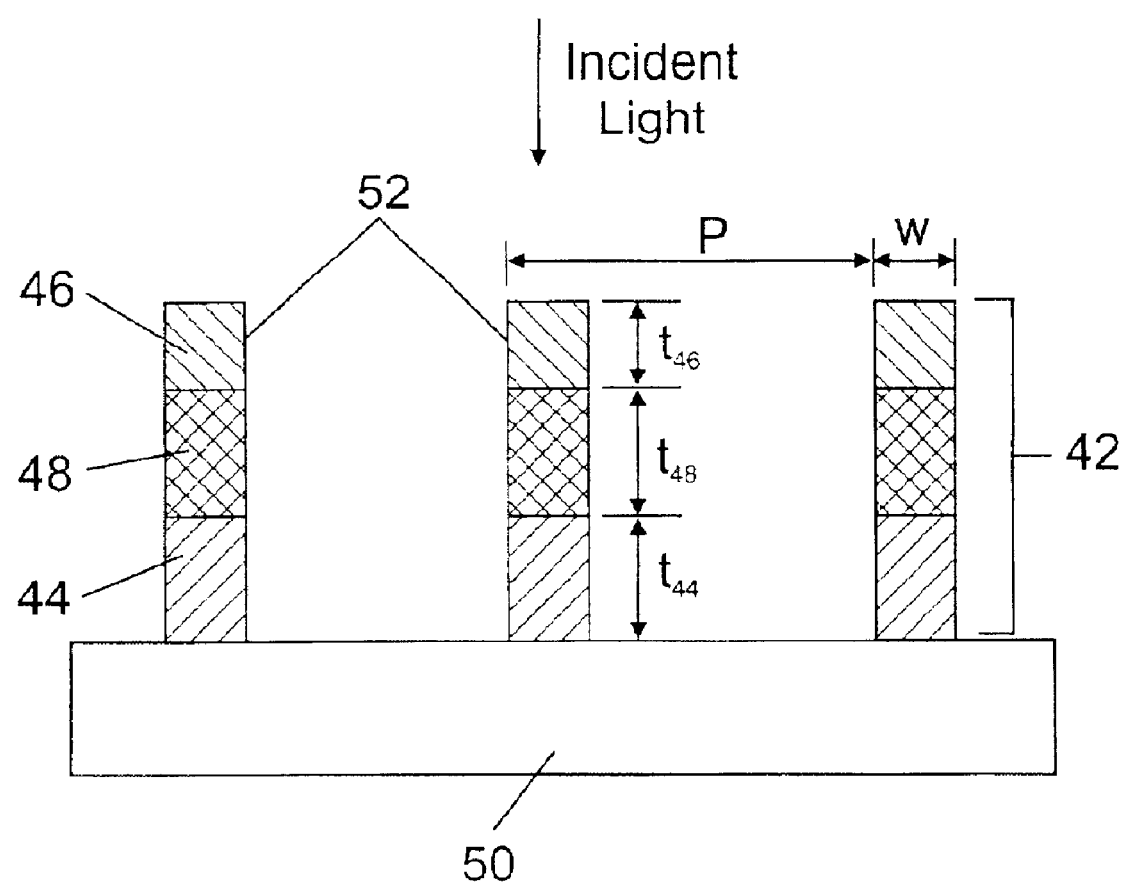
FIG. 5 shows an anti-reflective wire grid structure according to one embodiment of the invention.

As previously mentioned, conventional modeling of wire grid polarizers are generally metallic lines on transparent substrates which would produce useful polarizer, but reflection of rejected polarization could be excessive. FIG. 5 illustrates an anti-reflective wire grid structure 42 that suppresses reflection of rejected polarization. The anti-reflective wire grid structure 42 is made of three layers of material 44, 46, 48. The bottom layer 44 and the top layer 46 comprise a metallic material. The middle layer 48 comprises a dielectric material. The bottom layer 44 polarizes the light entering the substrate 50 while layers 44, 46, 48 in concert suppress the polarized light vector that is reflected from the bottom layer 44. In operation, rejected polarization is reflected from the bottom layer 44 and then backwards through the middle layer 48 and top layer 46. A small amount of incident light is also reflected from the top layer 46. The reflected incident light from layer 46, being 180° out of phase with the rejected/reflected light from layer 44, destructively interfere with each other. As will be shown below, the wire grid structure 42 can be designed such that the incident light cancels the rejected polarization in the middle layer 48.

The type of materials used in the layers 44, 46, and 48, the dimensions of the grid structure 42, i.e., the width w of the grid elements 52 and the thickness $t_{44}$, $t_{46}$, and $t_{48}$ of the layers 44, 46, and 48, and the grid period P are selected based on the desired wavelengths of operation and other performance criteria. Of interest in this application is to obtain a polarizer with high transmission (ideally >95%), low insertion loss (<2dB), high contrast ratio ($\geq$40 dB), and low reflection of the rejected polarization (<2%) at a particular wavelength, e.g., 1550 nm. To obtain a high contrast ratio, the metallic material used in the bottom and top layers 44, 46 should be reflective at the wavelengths of interest. Examples of metallic materials with high index at 1550 nm wavelength, include, but are not limited to, Ag, Al, Au, Cu, Ir, Mo, Ni, Os, Pt, Rh, and W. For the middle layer 48, the dielectric material should be transparent at the desired operating wavelengths. Examples of dielectric materials that are transparent in the near infrared and infrared region include, but are not limited to, $SiO_2$, Si, and GaAs.

The wire grid structure 42 was modeled using RCWA. The relevant parameters for the analysis are grid period, duty cycle, and aspect ratio. Duty cycle is the width w of the grid elements 52 divided by the grid period P. The aspect ratio is the sum of the thicknesses of the layers 44, 46, 48 divided by the width w of the grid elements 52. In the analysis, the index of the substrate 50 is set at 2.345 and the operating wavelength is set at 1550 nm. The objective in this analysis was to find wire grid structures which minimize reflection of rejected polarization and have a contrast ratio greater than 40 dB and a maximum aspect ratio less than or equal to 6. It should be clear that these constraints are not intended to limit the scope of the invention. Different constraints can be set based on the intended application of the wire grid structure 42. In general, the smaller the aspect ratio, the easier it is to fabricate the wire grid structure 42.

The following are examples of wire grid structures with zero percent reflection of rejected polarization. In the examples, the materials for the layers 44, 46, 48 are preselected. Therefore, the resulting wire grid structures are not necessarily the global optimum structures. Furthermore, different structures can be obtained by relaxing or changing the wire grid design constraints mentioned above.

EXAMPLE 3

This example assumes that the bottom layer 44 is made of aluminum, the middle layer 48 is made of silica, and the top layer 46 is made of gold. The grid dimensions are as follows: thickness of the bottom aluminum layer 44 is 466 nm, thickness of the top gold layer 46 is 47 nm, thickness of the middle silica layer 48 is 527 nm, and width of the each grid element 52 is 210 nm. The aspect ratio is 5, the grid period is 396 nm, and the duty cycle is 0.53. The transmission is 85.2% and the contrast ratio is 52.4 dB.

EXAMPLE 4

This example assumes that the bottom layer 44 is made of gold, the middle layer 48 is made of silicon, and the top layer 46 is made of aluminum. The grid dimensions are as follows: thickness of the bottom gold layer 44 is 412 mn, thickness of the top aluminum layer 46 is 16 nm, thickness of the middle silicon layer 48 is 211 nm, and width of each grid element 52 is 147 nm. The aspect ratio is 4.3, the grid period is 334 nm, and the duty cycle is 0.44. The transmission is 90.9% and the contrast ratio is 40.2 dB.

EXAMPLE 5

This example assumes that the bottom layer 44 is made of aluminum, the middle layer 48 is made of silica, and the top layer 46 is made of aluminum. The grid dimensions are as follows: thickness of the bottom aluminum layer 44 is 433 nm, thickness of the top aluminum layer 46 is 12 nm, thickness of the middle silica layer 48 is 524 nm, and width of the each grid element 52 is 235 nm. The aspect ratio is 4.1, the grid period is 398 nm, and the duty cycle is 0.59. The transmission is 84.7% and the contrast ratio is 59.7 dB.

EXAMPLE 6

This example assumes that the bottom layer 44 is made of gold, the middle layer 48 is made of silica, and the top layer 46 is made of gold. The grid dimensions are as follows: thickness of the bottom gold layer 44 is 439 nm, thickness of the top gold layer 46 is 33 nm, thickness of the middle silica layer 48 is 512 nm, and width of the each grid element 52 is 191 nm. The aspect ratio is 5.1, the grid period is 319 nm, and the duty cycle is 0.6. The transmission is 82.8% and the contrast ratio is 59.8 dB.

The examples above show that the wire grid structure 42 is effective in suppressing reflection of rejected polarization. The wire grid structure 42 can be fabricated on a Faraday rotator material using the process described above. This would involve depositing a bottom layer of metal on the Faraday rotator material, followed by a middle layer of dielectric material, and a top layer of metal. Preferably, the Faraday rotator material is coated with an anti-reflective coating prior to depositing the bottom layer of metal. The dimensions of the wire grid structure can be selected using appropriate modeling techniques such as RCWA. It should be noted that reactive ion etching should not be used to transfer the wire grid pattern into the wire grid material if any of the metal layers is made of gold or other similarly sensitive material.

The invention provides general advantages. Using the process described above, wire grid polarizers with submicron features can be formed on a Faraday rotator to make an integrated optical isolator. The anti-reflective wire grid structure suppresses reflection of rejected polarization, thus enhancing the performance of the optical isolator.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for a fabricating a wire grid polarizer, comprising:

depositing a wire grid material on a substrate, wherein the wire grid material comprises a dielectric material sandwiched between two metallic materials, wherein the dielectric and metallic materials act in concert to suppress reflection of rejected polarization;

depositing a resist film on the wire grid material;

bringing a mold with a wire grid pattern in contact with the resist film and compressing the mold and resist film together so as to emboss the wire grid pattern in the resist film; and transferring the wire grid pattern in the resist film to the wire grid material on the substrate by etching.

2. The method of claim 1, wherein the metallic materials are selected from the group consisting of Al, Au, Cu, Ir, Mo, Ni, Os, Pt, Rh, and W.

3. The method of claim 1, wherein the dielectric material is selected from the group consisting of Si, $SiO_2$, and GaAs.

4. The method of claim 1, wherein the resist film comprises a thermoplastic polymer.

5. The method of claim 4, further comprising heating the mold, the resist film and the substrate to a temperature above the glass transition temperature of the thermoplastic polymer prior to contacting the mold with the resist film.

6. The method of claim 1, further comprising applying an anti-reflective coating on the substrate prior to depositing the wire grid material on the substrate.

7. The method of claim 1, wherein the substrate is made of a magneto-optical garnet material.

8. A method of fabricating an integrated optical isolator, comprising:

forming a wire grid polarizer on a first and a second surface of a substrate made of a magneto-optical garnet material, the wire grid polarizer on the first surface being rotated at an angle relative to the wire grid polarizer on the second surface;

wherein forming the wire grid polarizer on the first and second surfaces of the substrate comprises depositing a wire grid material on the respective surface of the substrate, depositing a resist film on the wire grid material, bringing a mold with a wire grid pattern in contact with the resist film and compressing the mold and resist film together so as to emboss the wire grid pattern in the resist film, and transferring the wire grid pattern in the resist film to the wire grid material on the substrate by etching;

wherein the wire grid material deposited on at least one of the first and second surfaces of the substrate comprises a dielectric material sandwiched between two metallic materials, and wherein the dielectric and metallic materials act in concert to suppress reflection of rejected polarization.

9. The method of claim 8, wherein the metallic materials are selected from the group consisting of Al, Au, Cu, Ir, Mo, Ni, Os, Pt, Rh, and W.

10. The method of claim 8, wherein the dielectric material is selected from the group consisting of Si, $SiO_2$, and GaAs.

11. The method of claim 8, wherein the resist film comprises a thermoplastic polymer.

12. The method of claim 8, further comprising applying an anti-reflective coating on the substrate prior to depositing the wire grid material on the substrate.

13. The method of claim 11, further comprising heating the mold, the resist film and the substrate to a temperature above the glass transition temperature of the thermoplastic polymer prior to contacting the mold with the resist film.

* * * * *